(12) United States Patent
Johnston et al.

(10) Patent No.: US 7,826,171 B2
(45) Date of Patent: Nov. 2, 2010

(54) INTERCONNECT ARCHITECTURE FOR DISC DRIVE ARRAY

(75) Inventors: Alan Johnston, Londonderry (GB); Roger Hipwell, Eden Prairie, MN (US); Hans Leuthold, Santa Cruz, CA (US); Song S. Xue, Edina, MN (US); Nurul Amin, Woodbury, MN (US); Andrew White, Minneapolis, MN (US); Patrick Ryan, Saint Paul, MN (US); Bradley Ver Meer, Savage, MN (US); John Pendray, Cambridge, MA (US); Steven Kalderon, Minneapolis, MN (US); Wayne Bonin, North Oak, MN (US); Jeffery Berkowitz, Carver, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 954 days.

(21) Appl. No.: 11/656,659

(22) Filed: Jan. 23, 2007

(65) Prior Publication Data

US 2008/0174906 A1 Jul. 24, 2008

(51) Int. Cl.
*G11B 17/02* (2006.01)
(52) U.S. Cl. .................................. 360/97.01
(58) Field of Classification Search .................. None
See application file for complete search history.

(56) References Cited

U.S. PATENT DOCUMENTS

| 5,025,346 | A | 6/1991 | Tang et al. |
|---|---|---|---|
| 5,101,669 | A | 4/1992 | Holm-Kennedy |
| 5,710,678 | A | 1/1998 | Leuhold et al. |
| 5,856,895 | A | 1/1999 | Schaenzer |
| 6,079,088 | A | 6/2000 | Schaenzer |
| 6,208,485 | B1 * | 3/2001 | Chainer et al. ........... 360/98.07 |
| 6,318,176 | B1 | 11/2001 | McKenzie |
| 6,430,001 | B1 | 8/2002 | Chainer et al. |
| 6,499,881 | B2 | 12/2002 | Boutaghou et al. |
| 6,507,463 | B1 | 1/2003 | Boutaghou |
| 6,611,399 | B1 | 8/2003 | Mei et al. |
| 6,629,448 | B1 | 10/2003 | Cvancara |
| 6,655,002 | B1 | 12/2003 | Maimone et al. |
| 6,683,757 | B1 | 1/2004 | Bonin et al. |
| 6,731,465 | B2 | 5/2004 | Crane et al. |

(Continued)

FOREIGN PATENT DOCUMENTS

WO     WO 01/27638 A1     4/2001

OTHER PUBLICATIONS

U.S. Appl. No. 11/348,930, Xue et al.

(Continued)

*Primary Examiner*—Mark Blouin
(74) *Attorney, Agent, or Firm*—Hensley Kim & Holzer, LLC (57) ABSTRACT

In general, the invention is directed to techniques for integrated interconnects with a set of disc drives. The interconnects allow for a set of disc drives to be positioned in an array; for example, as set of disc drives may be stacked to communicate with a device through a single interface of the device. The interconnects may be formed as vias within the housing of the disc drives. Vias may produced using MEMS techniques, e.g., electroplating, as part of the manufacturing processes of the disc drive itself.

21 Claims, 11 Drawing Sheets

U.S. PATENT DOCUMENTS

| | | | |
|---|---|---|---|
| 6,832,383 | B2 | 12/2004 | Holmberg et al. |
| 6,685,044 | B2 | 3/2005 | Albrecht et al. |
| 6,882,488 | B1 | 4/2005 | Albrecht et al. |
| 6,906,879 | B1 | 6/2005 | Albrecht et al. |
| 7,077,010 | B2 | 7/2006 | Gangpathi |
| 2003/0030527 | A1 | 2/2003 | Mhani |
| 2004/0119354 | A1 | 6/2004 | Takada et al. |
| 2005/0006227 | A1 | 1/2005 | Hao et al. |
| 2005/0122609 | A1 | 6/2005 | Albrecht et al. |
| 2005/0014529 | A1 | 7/2005 | Stewart |

OTHER PUBLICATIONS

Product Brochure for The Bearing Solution, Bearing Co., Inc., 5 pages, printed Apr. 17, 2006.

Product Brochure for Technical Data, Bearing Co., Inc., 8 pages, printed Apr. 17, 2006.

www.incabloc.ch/incablocANG.html, 1 page, accessed on Apr. 17, 2006.

www.dbanks.demon.co.uk/ueng/; Home Page; Retrieved on Dec. 12, 2006; 1 page.

Wang, Li-Peng; Wolf, Richard; Wang, Yu; Deng, Ken; Zou, Lichen; Davis, Robert; Trolier-McKinstry, Susan; Design, Fabrication, and Measurement of High-Sensitivity . . . Piezoelectric Microelectromechanical Systems Accelerometers; Journal of Microelectromechanical Systems; Aug. 2003, p. 433-439, vol. 12, No. 4.

U.S. Appl. No. 11/656,692, Johnston, Alan.
U.S. Appl. No. 11/656,714, Hipwell, Roger.
U.S. Appl. No. 11/656,919, White, Andrew D.
U.S. Appl. No. 11/656,811, Hipwell, Roger.
U.S. Appl. No. 11/747,723.
U.S. Appl. No. 11/656,714.
U.S. Appl. No. 11/656,811.
U.S. Appl. No. 11/656,692.

\* cited by examiner

INTERCONNECT ARCHITECTURE FOR DISC DRIVE ARRAY

TECHNICAL FIELD

The invention relates to disc drives.

BACKGROUND

A disc drive typically includes a base to which various drive components are mounted. A cover connects with the base to form a housing that defines an internal, sealed environment. The components include a spindle motor, which rotates one or mote discs at a constant high speed. Information is written to and read from tracks on the discs through the use of an actuator assembly. The actuator assembly includes one or more actuator arms, which extend towards the discs. Mounted on each of the actuator arms is a head, which includes one or more transducer elements to perform read operations, write operations or read and write operations. Heads generally include an air bearing slider enabling the head to fly in close proximity above the corresponding media surface of the associated disc. An air bearing slider does not necessarily need air to operate. For example, in some designs, the internal environment of a disc drive may be filled with a fluid other than air, e.g., helium.

Increases in storage media density have allowed disc drive manufactures to produce disc drives with large capacities, but which are much smaller than disc drives generally found in desktop computers. For example, a five gigabyte disc drive having a smaller profile than a credit card, and a thickness less than a quarter-inch is currently available. Small disc drives are scaled versions of what has been developed for larger versions.

However, smaller disc drive designs create new challenges. Current disc drive designs have begun to reach the limits of conventional manufacturing techniques. Smaller disc drives developed for consumer electronics, e.g., cell phones and PDAs, must withstand higher shocks than desktop or laptop computer disc drives. Manufacturing tolerances of the mechanical components of a disc drive are relatively crude in small form factor drives. For this reason, physical stops, e.g., gimbal limiters, used in conventional disc drives to prevent the actuator assembly from contacting the media surface are only effective for large displacement shocks. In another example, the minimum thickness of a disc drive can be limited because suitable rotary bearings for the actuator assembly become difficult to manufacture for disc drive design with a small height, e.g., a height of less than 3.5 millimeters (0.14 inches). Also, manufacturing tolerances for disc drive designs force the gap between the permanent magnet and the voice coil of the actuator assembly to be at least about 25 micrometers. A smaller gap would be preferred to provide greater force, require less energy to move the actuator assembly, and/or use a smaller actuation mechanism, which generally includes a permanent magnet and voice coil. These and other challenges must be met to develop even smaller disc drive designs.

In a separate development, micro-electromechanical systems (MEMS) microstructures are manufactured in batch methodologies similar to computer microchips. The photolithographic techniques that mass-produce millions of complex microchips can also be used simultaneously to develop and produce mechanical sensors and actuators integrated with electronic circuitry. Most MEMS devices are built on wafers of silicon, but other substrates may also be used. MEMS manufacturing processes adopt micromachining technologies from integrated circuit (IC) manufacturing and batch fabrication techniques.

Like ICs, the structures are developed in thin films of materials. The processes are based on depositing thin films of metal, insulating material, semiconducting material or crystalline material on a substrate, applying patterned masks by photolithographic imaging, and then etching the films to the mask. In addition to standard IC fabrication methods, in MEMS manufacturing a sacrificial layer is introduced—a material which keeps other layers separated as the structure is being built up but is dissolved in the very last step leaving selective parts of the structure free to move.

Use of established "batch" processing of MEMS devices, similar to volume IC manufacturing processes, eliminates many of the cost barriers that inhibit large scale production using other less proven technologies. Although MEMS fabrication may consist of a multi-step process, the simultaneous manufacture of large numbers of these devices on a single wafer can greatly reduce the overall per unit cost.

Surface micromachining, bulk micromachining and electroforming (lithography, plating and molding) constitute three general approaches to MEMS manufacturing. Surface micromachining is a process based on the building up of material layers that are selectively preserved or removed by continued processing. The bulk of the substrate remains untouched. In contrast, in bulk micromachining, large portions of the substrate are removed to form the desired structure out of the substrate itself. Structures with greater heights may be formed because thicker substrates can be used for bulk micromachining as compared to surface micromachining.

Electroforming processes combine IC lithography, electroplating and molding to obtain depth. Patterns are created on a substrate and then electroplated to create three-dimensional molds. These molds can be used as the final product, or various materials can be injected into them. This process has two advantages. Materials other than the wafer material, generally silicon, can be used (e.g. metal, plastic, ceramic) and devices with very high aspect ratios can be built. Electroforming can also be a cost-effective method of manufacturing due to, e.g., relatively inexpensive processing equipment.

Another fabrication technique is wafer bonding. Wafer bonding can be used to bond micromachined silicon wafers together, or to other substrates, to form larger more complex devices. Examples of wafer bonding include anodic bonding, metal eutectic bonding and direct silicon bonding. Other bonding methods include using an adhesive layer, such as a glass, or photoresist.

MEMS fabrication processes usually include deposition, etching and lithography. These processes are repeated in according to an ordered sequence to produce the layers and features necessary for the MEMS structure. Deposition refers to the deposit of thin films of material and includes depositions from chemical reactions and depositions from physical reaction. Depositions from chemical reactions include chemical vapor deposition, electrodeposition, epitaxy, and thermal oxidation. These processes use solid material created directly from a chemical reaction in gas/or liquid compositions or with the substrate material. Generally, the chemical reaction will also produce one or more byproducts, which may be gases, liquids and even other solids. Depositions from physical reactions include physical vapor deposition (e.g., evaporation or sputtering) and casting. In depositions from physical reactions a deposited material is physically placed on the substrate without creating a chemical byproduct.

Etching is a process of removing portions of deposited films or the substrate itself. Two types of etching processes are wet etching and dry etching. Wet etching dissolves the material by immersing it in a chemical solution. Dry etching occurs by dissolving the material using reactive ions or a vapor phase etchant.

Lithography in the MEMS context is typically the transfer of a pattern to a photosensitive material by selective exposure to a radiation source such as light. When a photosensitive material is selectively exposed to radiation, e.g. by masking some of the radiation, the radiation pattern on the material is transferred to the material exposed. In this manner, the properties of the exposed and unexposed regions differ.

Deposition, etching and lithography processes may occur in combination repeatedly in order to produce a single MEMS structure. Lithography may be used to mask portions of a film or the substrate. Masked portions may be protected during a subsequent etching process to produce precise MEMS structures. Conversely, masked portions may themselves be etched. This process can be used to make a component or a mold for a component. For example, multiple layers of film can be deposited onto a substrate. Following each deposition step, a lithography step may be preformed-to define a desired cross section of a MEMS structure through that layer. After a desired number of layers have been deposited and individually subjected to radiation patterns in lithography steps, portions of the layers defining the MEMS structure can be removed with a single etching process, leaving a mold behind for the desired MEMS structure. A compatible material may then be injected into the mold to produce the desired MEMS structure. As shown by this example, precise and complex structures may be produced using MEMS techniques.

SUMMARY

In general, the invention is directed to techniques for integrated interconnects with a set of disc drives. The interconnects allow for a set of disc drives to be positioned in an array; for example, as set of disc drives may be stacked to communicate with a device through a single interface; The interconnects may be formed as vias within the housing of the disc drives. Vias may be produced using MEMS techniques, such as electroplating, and be integrated as part of the manufacturing processes of the disc drive itself.

In one embodiment, the invention is directed to a first disc drive comprising a housing, an interface for connecting a second disc drive on a first side of the housing, and a set of vias integrated with the housing, wherein the vias extend through the housing to connect the interface to a component located on a second side of the housing.

In another embodiment, the invention is directed to an assembly comprising an electronic device including a first interface and a first disc drive connected to the electronic device via the first interface. The first disc drive includes a housing including a set of vias integrated within the housing and a second interface. The assembly further comprises a second disc drive connected to the second interface. Communication signals between the second disc drive and the electronic device traverse one or more via of the set of vias.

In another embodiment, a disc drive comprises a housing fabricated using MEMS manufacturing processes, an interface for connecting an electronic device on a first side of the housing, and a set of vias integrated with the housing. The vias extend through the housing to connect the interface to a component located on a second side of the housing.

The invention may provide a number of advantages. For example, the invention may allow for multiple disc drives to function as a single unit. Furthermore, embodiments of the invention may allow multiple disc drives to be connected in a very space-efficient manner. As these examples illustrate, a single disc drive design may be adapted for a wide range of data capacity and size requirements.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
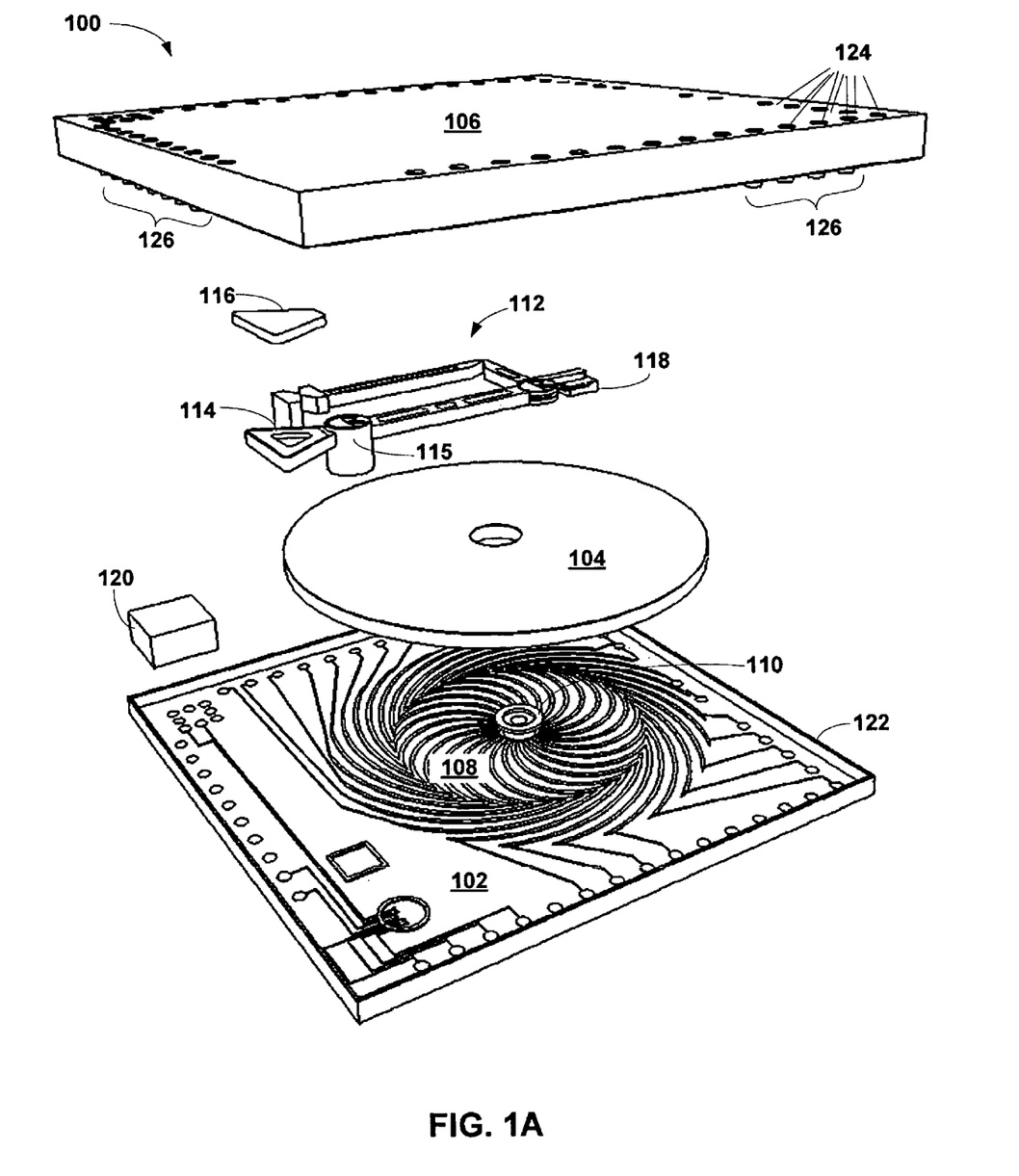
FIGS. 1A-C illustrate a disc dive manufactured using MEMS techniques.
Figure 1B:
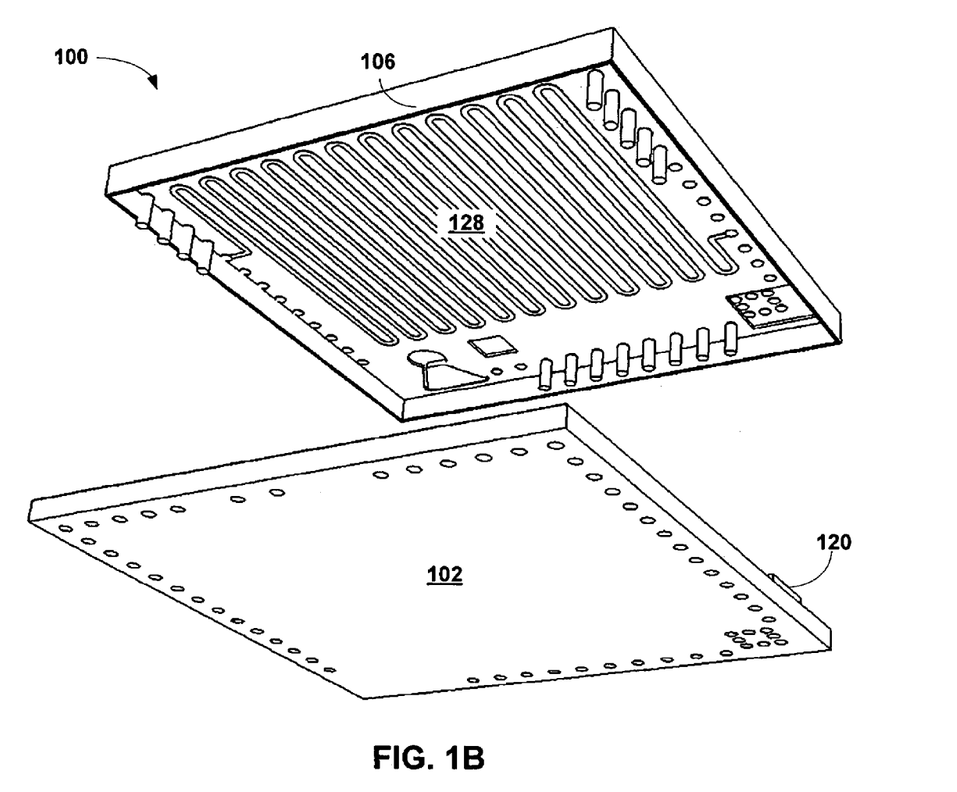
Figure 1C:
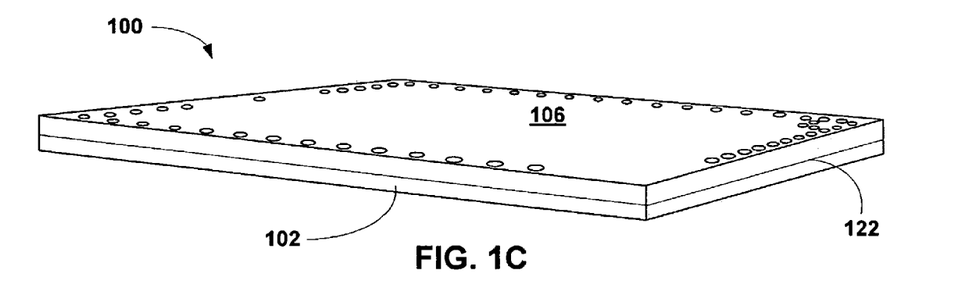

FIGS. 1A-1C illustrate disc dive 100 manufactured using MEMS techniques. FIGS. 1A and 1B are exploded peripheral views of disc drive assembly 100. FIG. 1C shows a disc drive 100 as manufactured. Various components of disc drive assembly 100 are manufactured using MEMS fabrication techniques. Generally speaking, MEMS is the integration of mechanical elements, sensors, actuators, and/or electronics on a substrate using microfabrication technology. The term "substrate" is used generically used throughout this document. For example, the term substrate is synonymous for terms such as sheet, wafer, film, platen, platform, plate and base as commonly used by those of skill in the art.

As an example, the substrate may be silicon commonly used to make integrated circuits (ICs). MEMS components of disc drive assembly 100 are fabricated using microfabrication process sequences. Micromechanical components, e.g., actuator assembly 112, are fabricated using compatible "micromachining" processes that selectively etch away parts of the silicon wafer or add new structural layers to form the mechanical and electromechanical devices. Micromachining techniques include deposition, etching lithographic and electroplating techniques.

Disc drive assembly 100 includes a base 102, disc 104 and cover 106. Disc drive 100 also includes a seal 122 between cover 106 and base 102 to prevent external contaminants from entering an internal environment of disc drive 100 through a seam formed between cover 106 and base 102. Seal 122 also allows disc drive to contain a fluid. For example, in some embodiments the internal environment may hold helium, or in other embodiments a liquid. For example, an internal environment holding a liquid may be useful to provide a boundary layer between moving parts of disc drive assembly 100.

Electronics 120 and actuator assembly 112 are mounted to base 102. Base 102 also includes integrated disc actuator electrodes 108. Electrodes 108 interact with elements integrated into disc 104 to rotate disc 104 about bearing 110 electrostatically. Actuator assembly 112 includes head 118 to read and/or write or data from disc 104. Actuator assembly 112 also includes coil 114, e.g., coil 114 may be a voice coil, which interacts with permanent magnet 116 to actuate actuator assembly 112 to place head 118 in a desired position relative to disc 104. Other embodiments use other actuation methods such as electromagnetic actuation. Integrated components of base 102 may be created using microfabrication processes performed on a single substrate wafer. In some embodiments, microfabrication processes may be used to form more than one of bases 102 on a single wafer.

Like base 102, cover 106 may include integrated components manufactured using a batch fabrication process, which may provide manufacturability, cost, and/or performance improvements. For example, permanent magnet 116 may be integrated with cover 106. As shown if FIG. 1B, cover 106- includes an integrated environmental control component 128. Integrated environmental control component 128 may be a resistive element to heat disc drive 100 and/or a cooler, e.g., Peltier cooling system. Integrated environmental control component 128 provides a controlled environment for disc drive 100.

Figure 2:
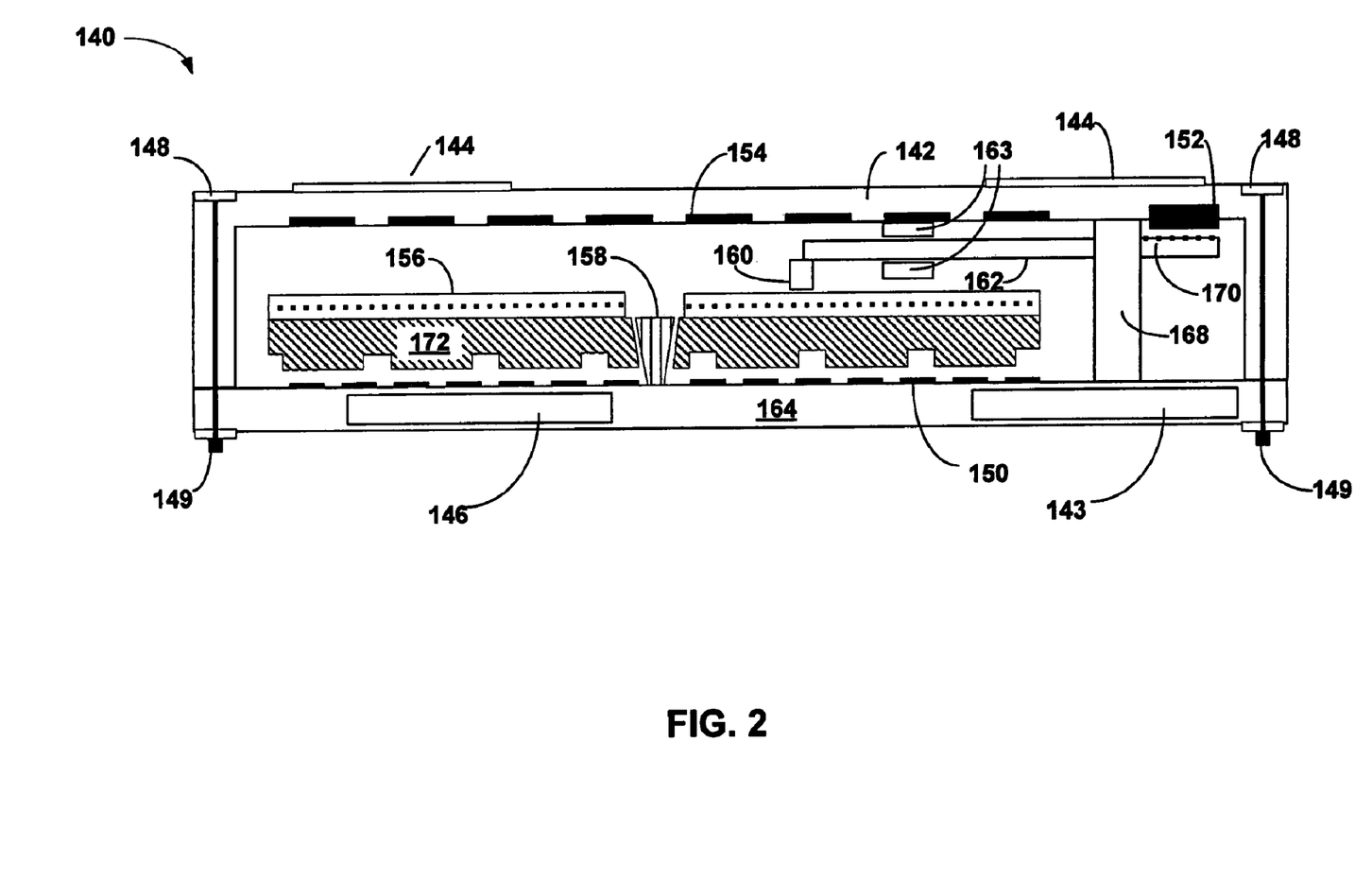
FIG. 2 is a cut-away illustration of a disc dive manufactured using MEMS techniques.

In other embodiments, as shown in FIG. 2, disc drive 100 may also include integrated sensors, such as a thermometer, gyroscope, position sensor, pressure sensor, or accelerometer. Such sensors may be used independently or in conjunction with integrated environmental control component 128. Sensors and/or integrated environmental control component 128 can allow disc drive 100 to respond to changing environmental conditions and/or to shocks and other events. This may increase reliability of disc drive 100, expand allowable operating conditions and/or control the effect of thermal expansion on components of disc drive 100.

As shown in FIG. 1A, cover 106 also includes vias 124, which provide connections between multiple disc drive 100s arranged in a stack or an array. For example, as shown in FIG. 1A vias 124 connect to electrodes 108. With these connections, electrodes 108 may be activated simultaneously to rotate disc 104 with actuation electrodes 108 in one or more other disc drives 100. Vias 124 may also connect electronics 120 between multiple disc drives 100. In this manner, a device having only single disc drive interface may control a stack or an array of disc drives. Electrical studs 126 connect base 102 to vias 124 on cover 106. In disc drive 100, not all vias 124 are paired with one of electrical studs 128, in other embodiments may include more or less vias 124 and/or more or less electrical studs 126.

Disc drive 100 may be manufactured according to a variety of micromachining operations. For example, in one embodiment, base 102 including integrated actuator assembly 112, electronics 120 and disc actuator electrodes 108, may be formed on a single wafer. Cover 106 may be formed on a second wafer. Disc 104 may be formed on the same wafer as cover 106 or base 102, or on its own separate wafer. Assembly of the base and disc may occur before etching of sacrificial layers around disc 104 occurs. In some embodiments, each wafer may contain components for more than one disc drive. Also, separate components may be batch fabricated and assembled in a pick-and-place or batch transfer method.

FIG. 2 illustrates an exemplary disc drive 140 manufactured using MEMS techniques. Disc drive 140 includes a base 164 and a cover 142 that form a sealed housing of disc drive 140. Within the housing, integrated actuation electrodes 150 interact with disc 172 to rotate disc 172 about spindle 158. For example, disc 172 may include integrated magnets or electrostatic elements to receive actuation forces from integrated actuation electrodes 150.

Disc 172 includes a media surface 156, which may comprise, for example, magnetic particles. Disc 172 may optionally include a shield layer (not shown in FIG. 2) below media surface 156 to protect media surface 156 from electromagnetic fields cause by actuation electrodes 150 of disc 172. Disc 172 may also combine with base 164 to form a fluid bearing that creates a boundary layer to keep disc 172 from contacting base 164 during operation of disc drive 140. As referred to herein, a fluid bearing includes two surfaces that support a pressurized layer of fluid between the two surfaces to limit or prevent contact between the two surfaces during movement of one surface relative to the other surface. For example, one of the two surfaces may be textured to produce a desirable pressurized boundary layer of fluid between the two surfaces during movement of one surface relative to the other surface. Spindle 158 may also include fluid bearings to prevent disc 172 from contacting spindle 158 during operation of disc drive 140. In this manner, disc 172 is constrained not only by spindle 158, but also by boundary layer fluid pressure forces from fluid bearings. The bearing fluid could be a liquid or a gas.

Actuator arm 162 holds head 160 in close proximity to media surface 156. Head 160 traverses media surface 156 of disc 172 to read from and/or write to media surface 156. For example, actuator arm 162 may actuate head 160 with a stroke of at least 0.5 millimeters. The stroke is the maximum movement distance of head 160 in a plane parallel to media surface 156 provided by the range of motion of actuator arm 162. As other examples, actuator arm 162 may actuate head 160 with a stroke of at least 1 millimeter, with a stroke of at least 3 millimeters, with a stroke of at least 5 millimeters, with a stroke of at least 10 millimeters, with a stroke of at least 15 millimeters, with a stroke of at least 20 millimeters, or with a stroke of at least 25 millimeters.

Coil 170 interacts with magnet 152 to actuate actuator arm 162 about bearing 168. MEMS techniques provide for very precise layer thicknesses such that smaller tolerances need to be taken into account in the design of disc drive 140. For this reason, coil 170 may be located at a distance of less than 25 micrometers from magnet 152. For example, coil 170 may be located at a distance of less than 20 micrometers from magnet 152. As other examples, coil 170 may be located at a distance of less than 15 micrometers from magnet 152, a distance of less than 10 micrometers from magnet 152, or a distance of less than 5 micrometers from magnet 152. In other embodiments, the locations of magnet 152 switched with coil 170 such that magnet 152 is part of actuator arm 162 and coil 170 is fixed to cover 142. In other embodiments, magnet 152 may be replaced a coil that interacts with coil 170. Such embodiments also allow for a gap between the two coils that is as small as the gap between coil 170 and magnet 152.

Disc drive 140 includes many features that would be difficult or even impossible to include in disc drive manufactured using conventional techniques. For example, disc drive 140 includes motion limiters 163. Because MEMS techniques provide for very precise layers, motion limiters 163 are located in close proximity to actuator arm 162. For example, motion limiters 163 may be located at a distance of less than 25 micrometers from actuator arm 162 or a distance of less than 20 micrometers from actuator arm 162. As other examples, motion limiters 163 may be located at a distance of less than 15 micrometers from actuator arm 162, a distance of less than 10 micrometers from actuator arm 162, or a distance of less than 5 micrometers from actuator arm 162.

As another example, disc drive 140 includes an integrated sensor 146. Integrated sensor 146 may be, e.g., a thermometer, gyroscope, position sensor, pressure sensor, humidity sensor or accelerometer. Integrated sensor 146 may measure ambient conditions within the drive which may be useful to, e.g., to control head-disc spacing. As another example, integrated sensor 146 may be used to detect shocks. For example, in the event of a shock, head 160 may be moved away from media surface 156 to prevent damage to media surface 156.

Disc drive 140 also includes an integrated environmental control component 154, which may include one or both of a resistive heating element and/or a Peltier cooling system. Disc drive 140 may also include control circuitry integrated within its housing. In this manner, disc drive 140 does not require a separate printed circuit board to control its operation. However, disc drive 140 may mount to a printed circuit board as part of a larger device, e.g., a cell phone or other consumer electronic device.

Disc drive 140 further includes vias 148 integrated into its housing; vias 148 include an electrically conductive paths 149, which may allow multiple disc drive 140 provide an interface for another disc drive. For example, disc drive 140 may mount to a printed circuit board and another disc drive may mount on top of disc drive 140 using bond pads 144 and communicate with the printed circuit board through electrically conductive paths 149 of vias 148.

Figure 3A:
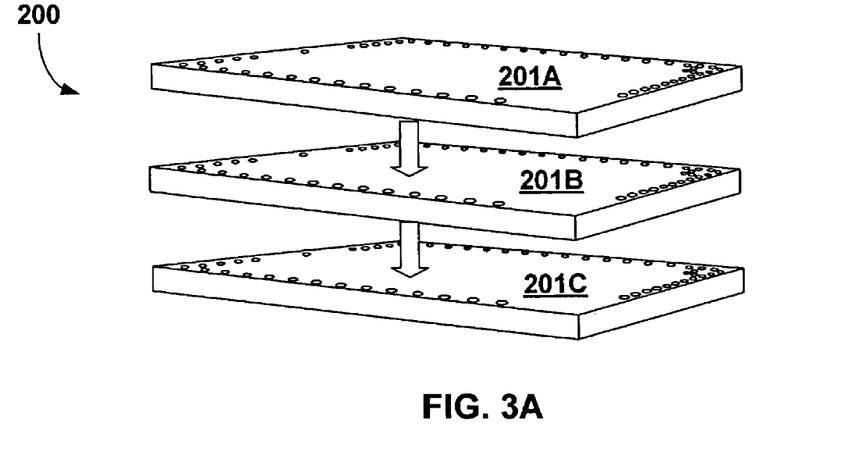
FIGS. 3A-C illustrate an array of disc drives including integrated vias within the disc drive housings.
Figure 3B:
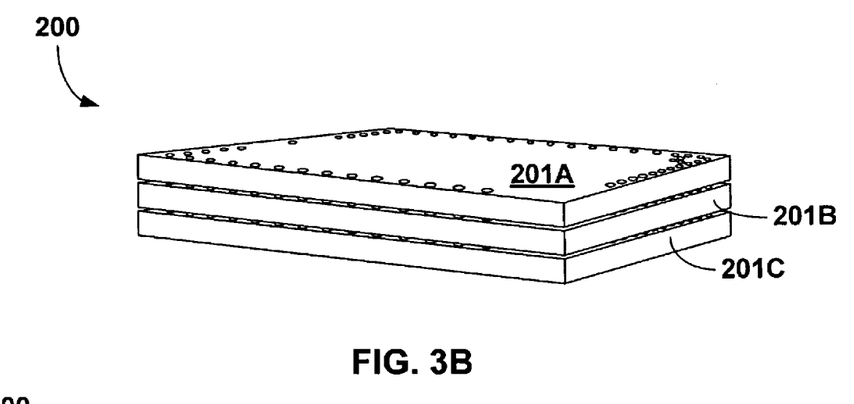
Figure 3C:
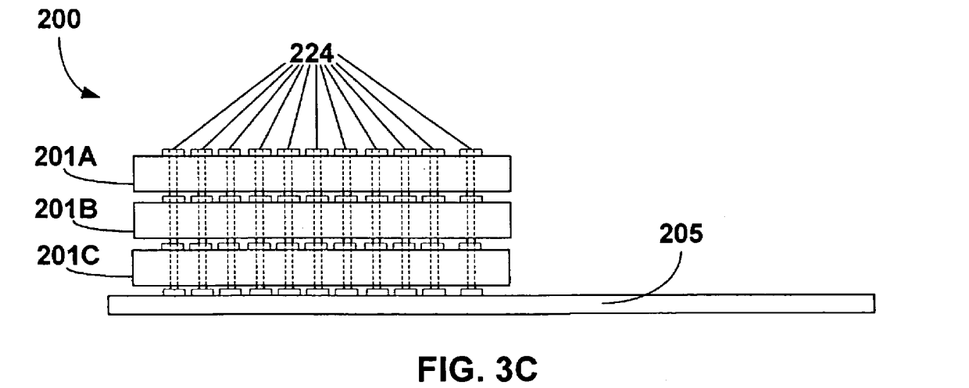

FIGS. 3A-C illustrated a set of disc drives 200 including disc drives 201A-201C (disc drives 201). As shown in FIG. 2C, disc drives 201A-C ("disc drives 201") mount onto interface component 205, which may be, for example, a printed circuit board or an integrated circuit. Interface component 205 provides an interface to the device on which disc 201 are operating. For example, disc drives 201 may be part of a consumer device, e.g., a cell phone, and interface component 205 may be a printed circuit board or an integrated circuit containing electronics for the consumer device.

Vias 224 are shown in FIG. 2C. Vias 224 are integrated into the housings of disc drives 201. For example, disc drives 201 may be manufactured using MEMS techniques. Vias 224 are conductive paths through substrates used in the manufacture of disc drives 224. For example, vias 224 may be created using patterning techniques as part of the manufacturing process for the housings of disc drives 201.

Disc drive 201A communicates with interface component 205 using vias 224. Vias 224 in disc drive 201A connect with vias 224 in disc drive 201B, which connects with interface component 205. In this manner, each of disc drives 201 can communicate with interface component 205 using vias 224. Communication protocol with interface component 205 may allow each of disc drives 201 to communicate using the same vias 224. In other embodiments, each disc drive may communicate through a separate set of vias 224. Additionally, disc drives 201 may communicate with each other independently of interface component 205. For example, disc drive 201B may perform an automatic data back-up operation by sending data to disc drive 201A.

Vias 224 are used not only for data transfer communications, but also to provide electrical power to disc drives 201. For example, one use of power to disc drives 201 may be to operate an environmental control components in one or more of disc drives 201. For example, environment control components in each of disc drives 201 may connect to the same set of vias 224, such that an environmental control component in disc drive 201A operates at the same time as environmental control components in disc drives 201B and C. In other embodiments, each of disc drives may independently operate their own environmental control components.

Figure 4A:
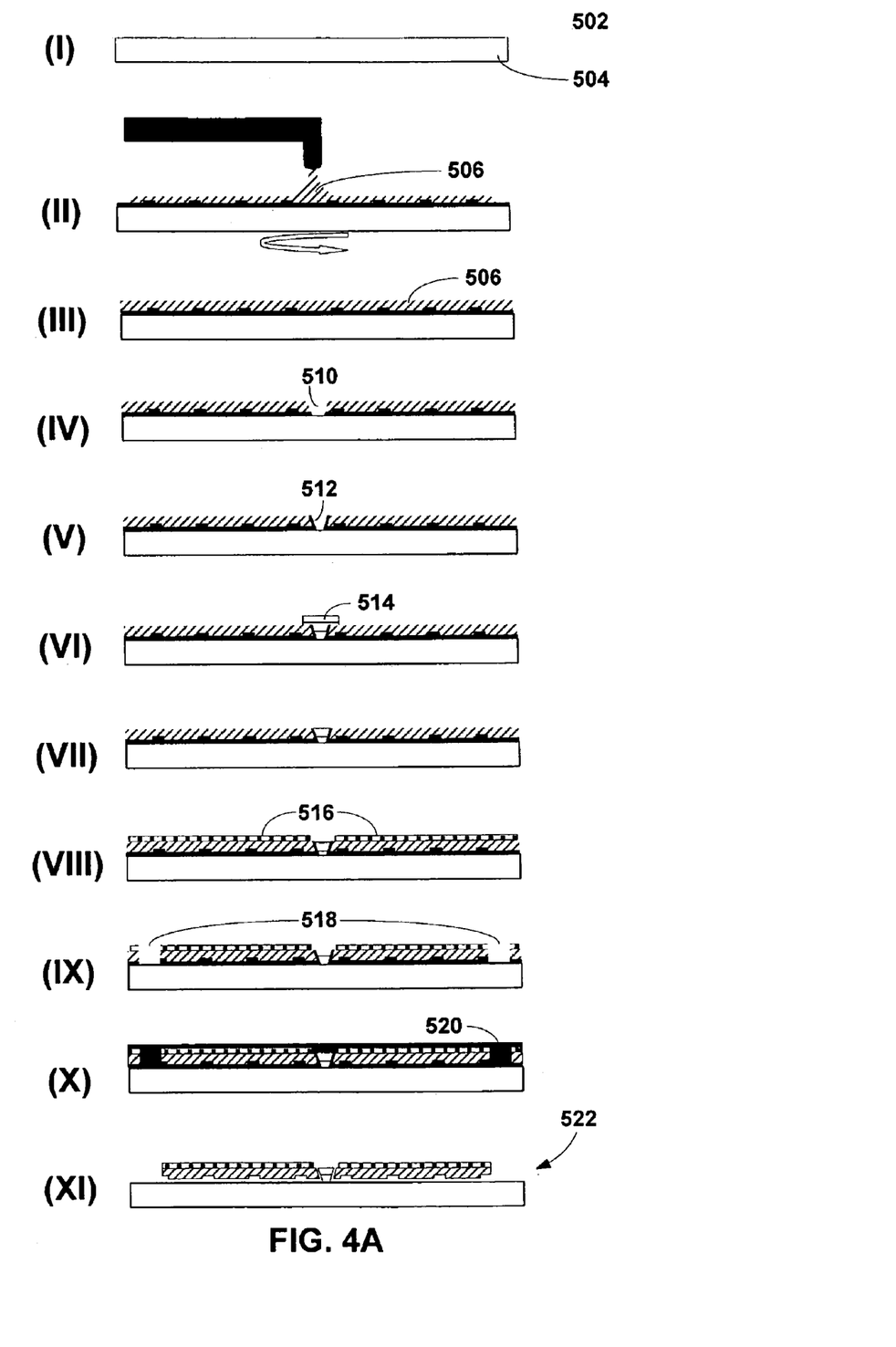
FIGS. 4A-C illustrate exemplary process steps to produce a MEMS disc drive having a center hub to constrain the disc as it rotates.
Figure 4B:
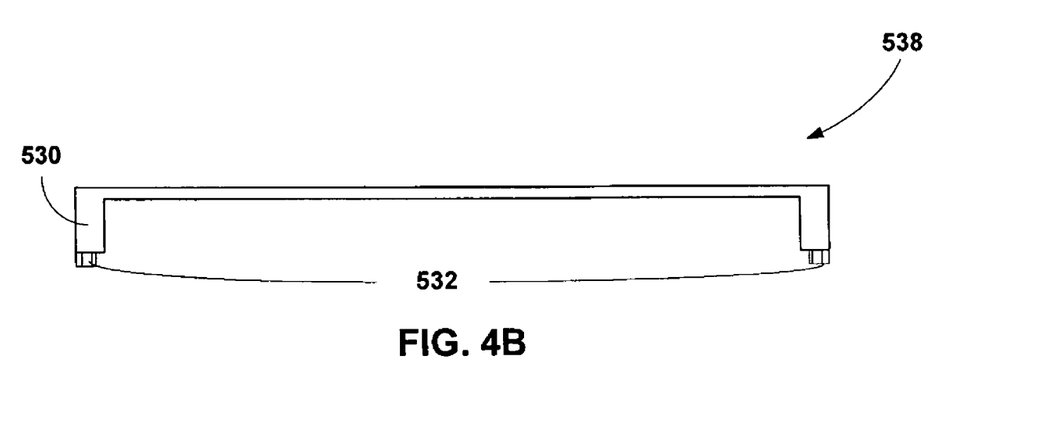
Figure 4C:
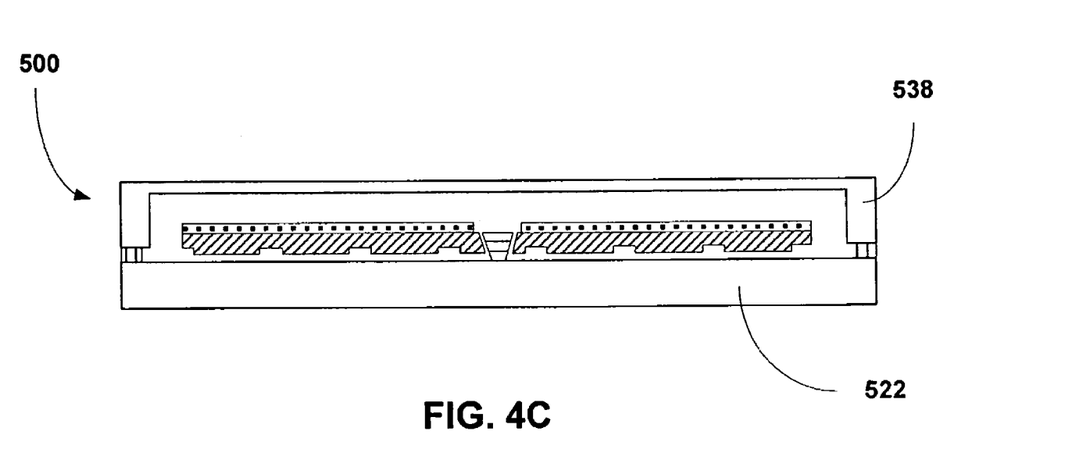

FIGS. 4A-C illustrate exemplary process steps to produce MEMS disc drive 500 having a center hub to constrain the disc as it rotates. FIG. 4A shows MEMS process steps I-XI performed on a first wafer substrate 504 to create integrated base and disc 522. FIG. 4B shows cover 538 created on a second wafer substrate 530. FIG. 3C shows cover 538 bonded to integrated base and disc 522 forming disc drive 500. One or more manufacturing processes may be required between each step shown in FIGS. 4A-C.

As shown in FIG. 4A, integrated base and disc 522 is produced from a single wafer using a series of MEMS processes. Steps I-III form the basic disc geometry of integrated base and disc 522. In step I patterned sacrificial layer 502 is molded to substrate 504. For example, patterned sacrificial layer 502 may be $SiO_2$. Patterned sacrificial layer 502 may be shaped to create fluid bearings for the-disc of integrated base and disc 522. In step II, disc material 506 is deposited on top of patterned sacrificial layer 502. For example, disc material 506 may be spun-on glass. In step III, disc material 506 is planarized. A deposition step (not shown) may be used to add a shield layer and/or media layer, e.g., a magnetic media layer, to disc material 506.

Steps IV-VII form the hub of integrated base and disc 522. The hub constrains the disc as it rotates. In step IV, hub geometry 510 is etched into disc material 506 and sacrificial layer 502. For example, hub geometry 510 may contain fluid bearing sliders to increase boundary layer fluid pressure of the disc as disc drive 500 operates. In step V, hub sacrificial layer 512 is deposited and patterned. For example, sacrificial layer 512 may be the same material as patterned sacrificial layer 502, e.g., $SiO_2$. In step VI, hub material 514 is deposited. For example, hub material 514 may be polysilicon. For step VII, hub material 514 is planarized to complete the shape of the hub of integrated base and disc 522.

Steps VIII and IX form add the media surface to the disc of integrated base and disc 522 and finish the shape of the disc. In step VIII, media layer 516 is deposited and patterned. For example, media layer 516 may be a thin film magnetic media. For step IX, disc geometry is patterned by etching gap 518 through media layer 516, disc material 506 and into patterned sacrificial layer 502.

Steps X and XI complete integrated base and disc 522. In step X, sacrificial layer 520 is deposited and patterned as a protective layer in order to protect integrated base and disc 522 during back end processing steps, such as singulation of separate components. For example, sacrificial layer 520 may be the same material as sacrificial layer 512 and patterned sacrificial layer 502, e.g., $SiO_2$. In step XI, sacrificial layer 520, sacrificial layer 512 and patterned sacrificial layer 502 are etched. For example, etching may be performed using anhydrous IF and alcohol vapor etch. After etching disc material 506 is released from substrate 504, and the disc may rotate freely about the hub.

FIG. 4B shows cover 538 created on a second wafer substrate 530. For example, substrate 530 may comprise silicon. Cover 538 may be created using bulk micromachining processes. Cover 538 also includes patterned bonding material 532. Cover 538 may additionally include an integrated permanent magnet to interact with a voice coil of an actuator assembly and/or an environmental control component.

FIG. 4C shows cover 538 bonded to integrated base and disc 522 forming disc drive 500. Cover 538 is held to the base of integrated base and disc 522 with bonding material 532. Bonding material 532 creates a hermetic seal to contain fluids within disc drive 500. For example fluids contained within disc drive 500 may be helium or other gaseous or liquid fluids.

Processes other than those described, may also be used in the manufacture of disc drive 500. For example, burnishing could be used to correct for small defects. Also, disc drive 500 may include additional features not shown in FIGS. 4A-C.

For example a protective coating may be added to hub 510 or elsewhere for lubrication or mechanical robustness. For example, disc drive 500 also includes an actuator assembly and may also include actuator electrodes integrated within its base and permanent magnets integrate within its disc. For example, disc drive 500 may include an integrated sensor, e.g., a thermometer, gyroscope or accelerometer. Disc drive 500 may also include an integrated environmental control component, e.g., a resistive heating element and/or a Peltier cooling system. Disc drive 500 may also include control circuitry integrated within its housing. Each of these features may be manufactured using MEMS techniques as part of the first wafer, the second wafer or one or more additional wafer (s).

The techniques described with respect to FIGS. 4A-C for depositing the disc structure allow integration of disc and disc actuator including features such as electrodes or magnets. Alternatively, a disc may microfabricated out of a bulk material, e.g., silicon and used with other conventionally manufactured disc drive components.

Figure 5A:
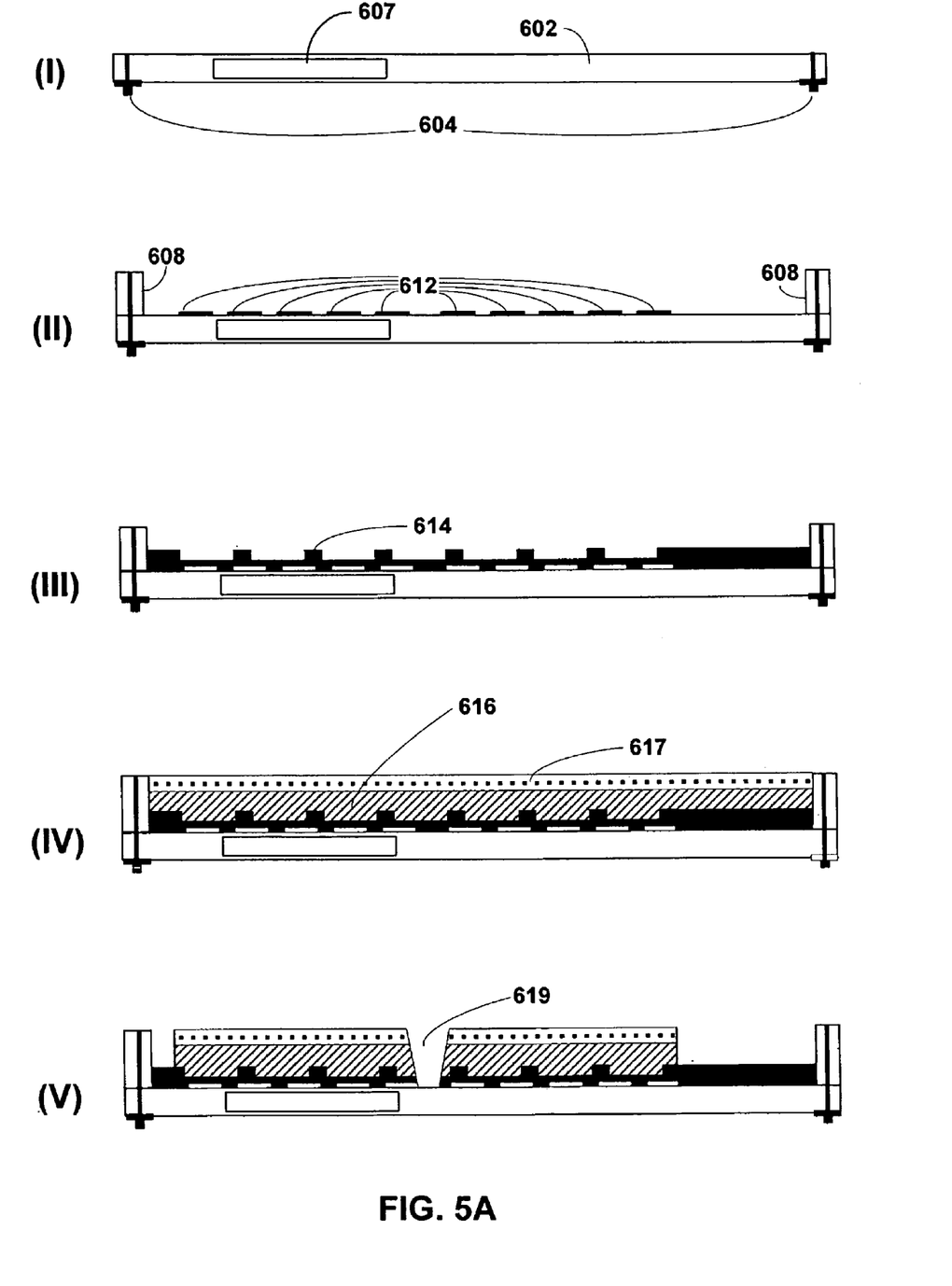
FIGS. 5A-C illustrate exemplary process steps to produce a disc drive including a center hub on a single wafer substrate.
Figure 5B:
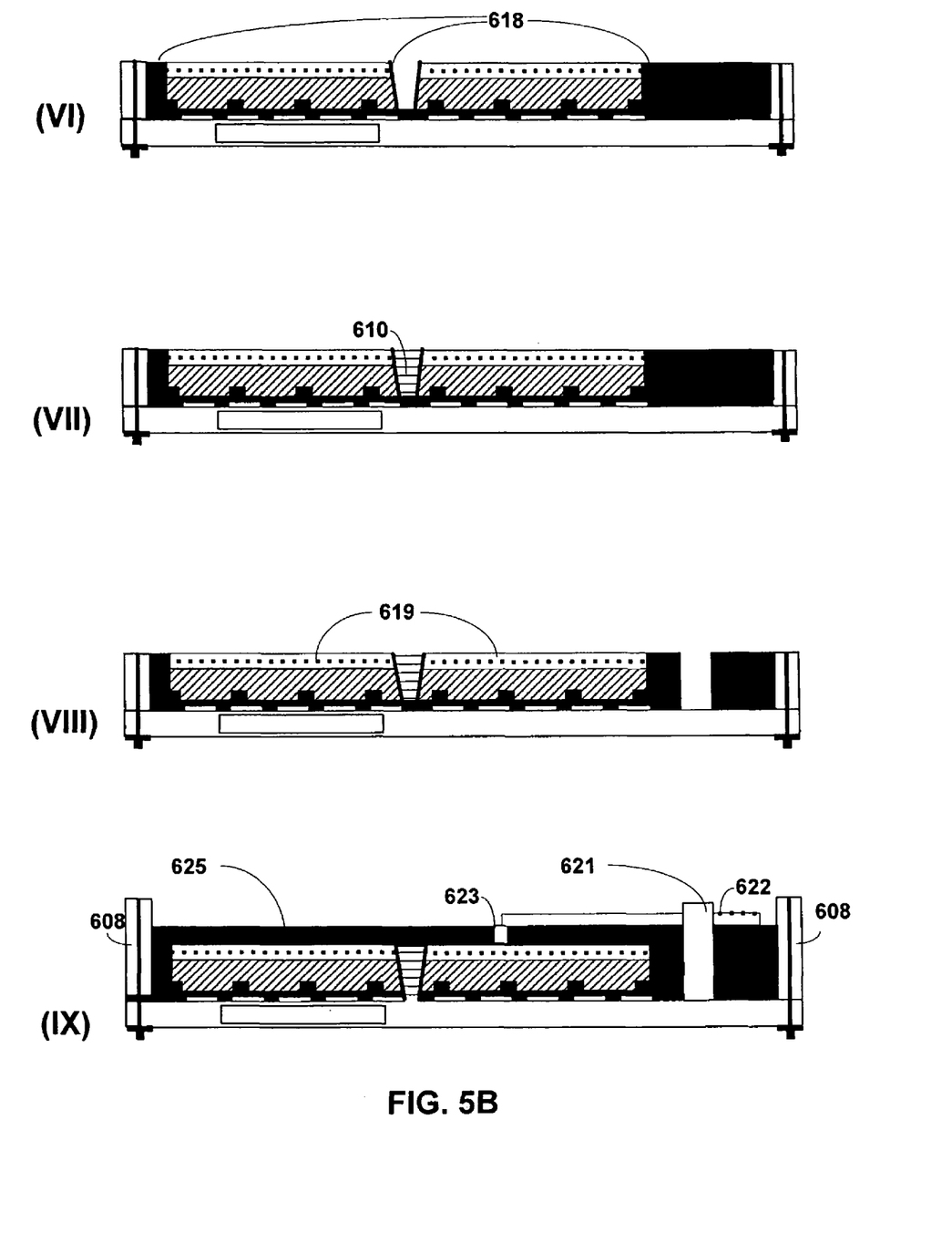
Figure 5C:
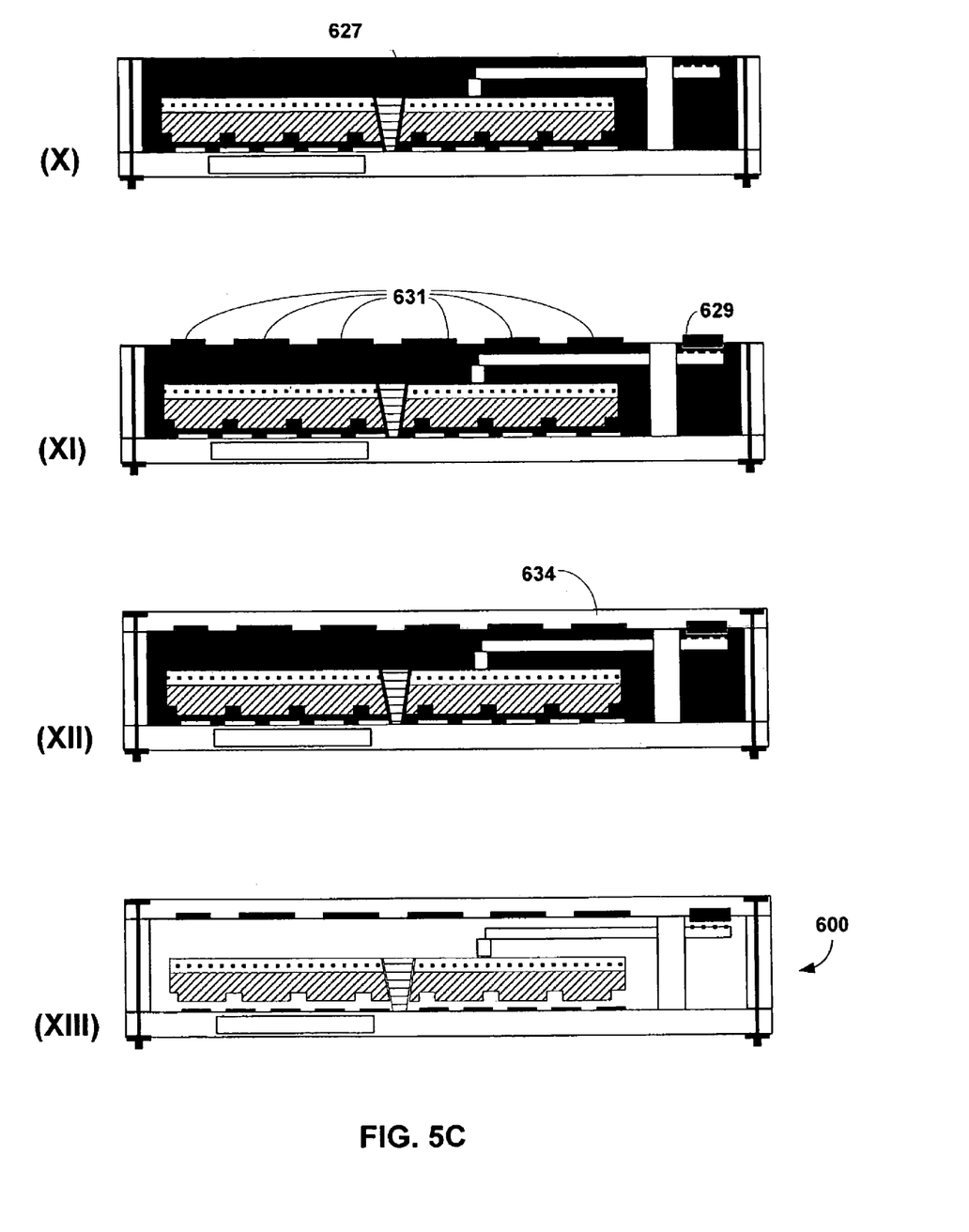

FIGS. 5A-C illustrate disc drive 600 including a center hub formed from single wafer substrate 602 and micromachine process steps for its manufacture. FIGS. 5A-C illustrate steps I-XIII, each step representing a point in the manufacturing process of disc drive 600. One or more manufacturing processes may be required between each step shown in FIGS. 5A-C.

Steps I and II, shown in FIG. 5A, produce a base and disc actuation component for disc drive 600. In step I, wafer vias 604 and sensor 607 are patterned in wafer substrate 602. In this manner, wafer vias 604 and sensor 607 are integrated within the housing of disc drive 600. For example wafer substrate 602 may be a silicon wafer substrate. Wafer vias 604 may provide electrical connections, e.g., power and/or data signal connections, for disc drive 600. Additional electrical connection paths (not shown) may also be patterned in wafer substrate 602. Sensor 607 may be, e.g., a thermometer, gyroscope or accelerometer. In step II, actuation electrodes 612 deposited and patterned. Spacer layer 608 is also deposited and patterned in step II. For example, spacer layer 608 may comprise silicon. Spacer layer 608 is patterned to integrate vias 604 within the housing of disc drive 600.

Steps III-V, shown in FIG. 5A, produce a recordable disc of disc drive 600. In step III, sacrificial layer 614 is deposited. For example, sacrificial layer 614 may comprise germanium. Sacrificial layer 614 is shown with fluid bearing features. In step IV, first disc material layer 616 is deposited. For example, disc material layer 616 may comprise spin-on glass. After disc material layer 616 is deposited, media surface 617 is deposited on top of disc material layer 616. For example, media surface 617 may include magnetic particles. In step V, disc material layer 616 including media surface 617 is patterned and etched to form the shape of the recordable disc. The disc pattern may include textured fluid bearing surfaces.

Steps VI and VII, shown in FIG. 5B, produce center hub 610 for disc drive 600. In step VI, sacrificial layer 618 is deposited. For example, sacrificial layer 618 may consist of the same substance as sacrificial layer 614. For example, sacrificial layer 618 may comprise germanium. Sacrificial layer may include fluid bearing features (not shown) for center hub 610. In step VII, center hub 610 is deposited on top of sacrificial layer 618.

Steps VIII and IX, shown in FIG. 5B, produce actuator arm 621 for disc drive 600. In step VIII, sacrificial layer 618 is etched. In step IX, actuator arm 621 is deposited and patterned on top of sacrificial layer 618. Actuator arm 621 includes head 623 and coil 622.

The manufacturing process of disc drive 600 completes with steps X-XIII, as shown in FIG. 5C. In step X, top sacrificial layer 627 is deposited. For example, top sacrificial layer 627 may consist of the same substance as sacrificial layers 614 and 618. For example, top sacrificial layer 627 may comprise germanium. In step XI, environmental control component 631 and permanent magnet 629 are deposited and patterned. Environmental control component 631 may include one or both of a resistive heating element and/or a Peltier cooling system. When disc drive 600 is operational, coil 622 interacts with magnet 629 to actuate actuator arm 621. In other embodiments, magnet 629 maybe replaced with a coil to interact with coil 622.

In Step VII, top layer 634 is deposited and planarized. For example, top layer 634 may consist of the same material as wafer substrate 602, spacer layer 608 and center hub 610. E.g., top layer 634 may comprise silicon. In step XII, sacrificial layers 614, 618 and 627 are removed. For example, sacrificial layers 614, 618 and 627 may be removed using wet etching techniques.

Disc drive 600 may include additional features not shown in FIGS. 5A-C. For example, disc drive 600 may contain control circuitry integrated and additional electrical connection vias integrated within its housing. Each of these features may be manufactured using MEMS techniques.

Figure 6A:
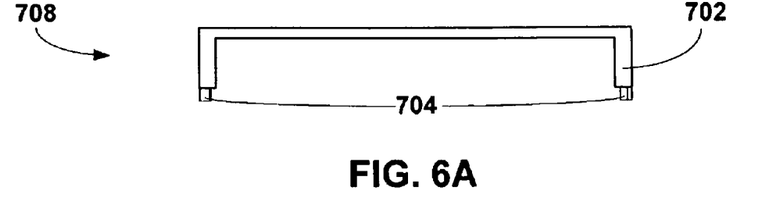
FIGS. 6A-D illustrate exemplary process steps to produce a MEMS disc drive having air bearing sliders at the outside diameter of the disc in lieu of a center hub to constrain the disc as it rotates.
Figure 6B:
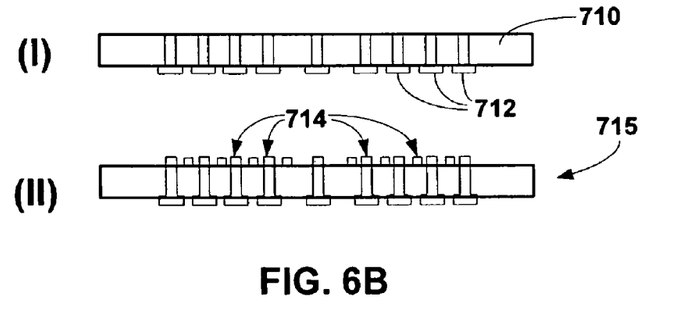
Figure 6C:
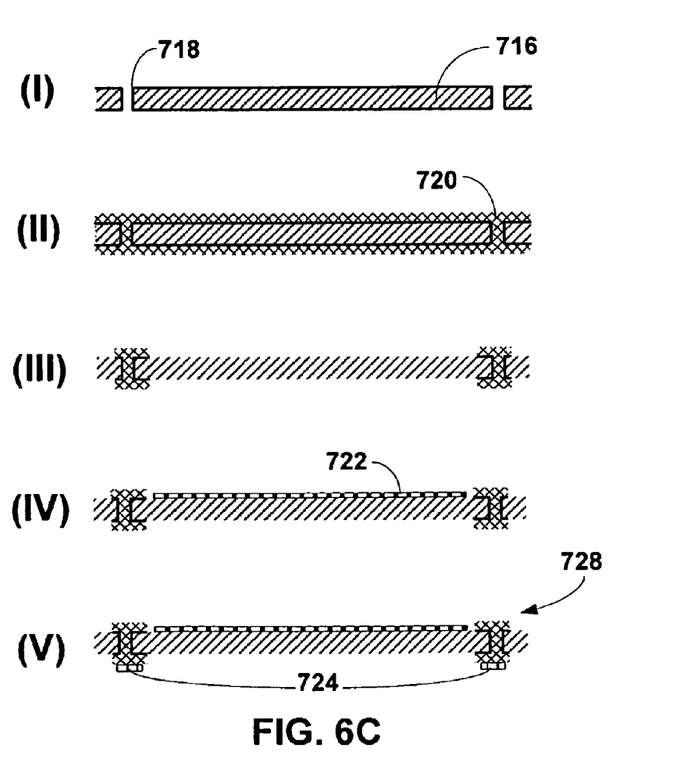
Figure 6D:
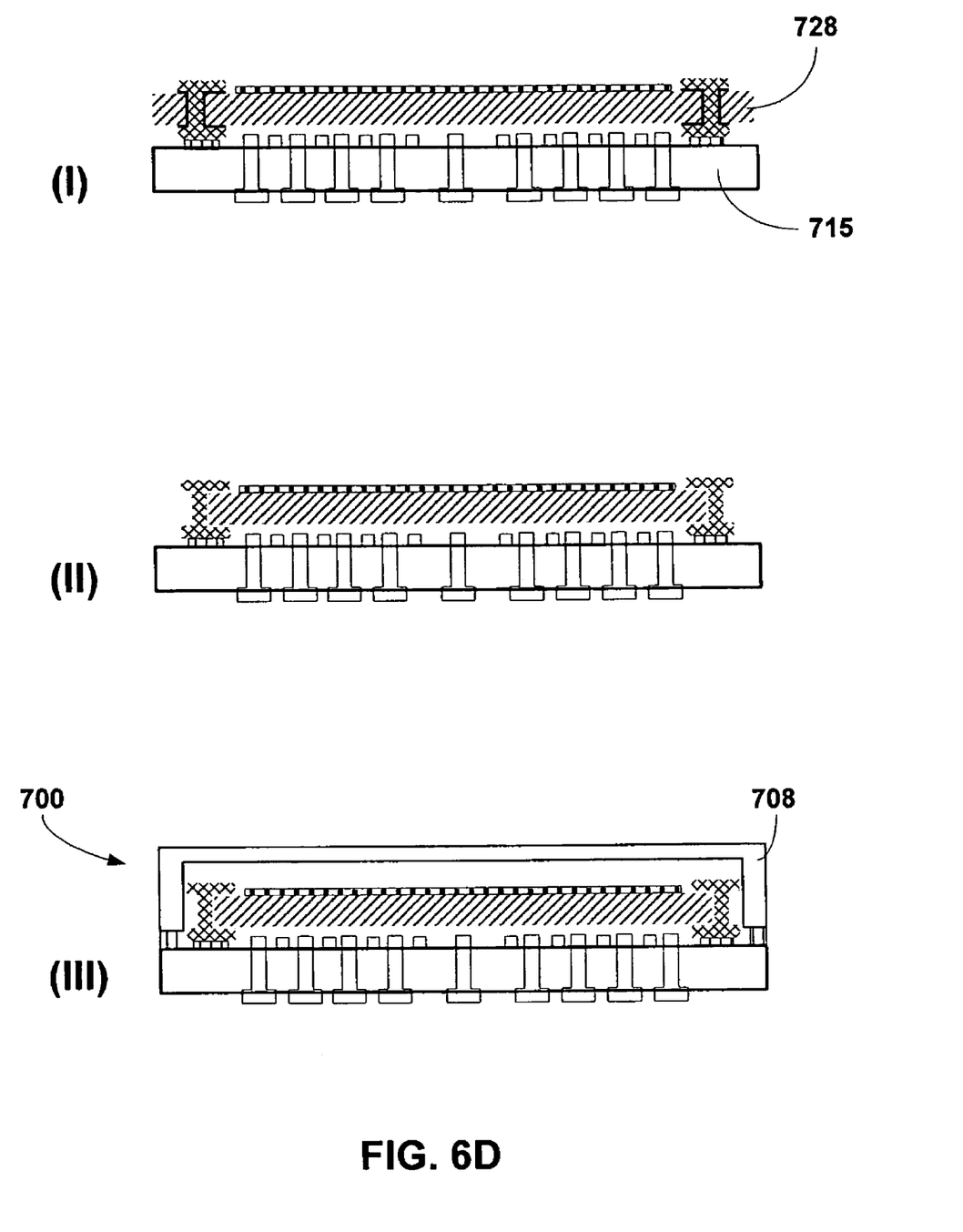

FIGS. 6A-D illustrate exemplary process steps to produce MEMS disc drive 700 having fluid bearing sliders at the outside diameter of the disc to constrain the disc as it rotates. FIG. 6A shows cover 708 created on a first wafer substrate 702. FIG. 6B shows MEMS process steps I and II performed on a second wafer substrate 710 to create integrated base and actuator electrodes 715. FIG. 6C shows MEMS process steps I-V performed on a third wafer substrate 716 to create integrated disc and outer diameter fluid bearing 728. FIG. 6D shows MEMS process steps I-Ell to combine cover 708, integrated base and actuator electrodes 715 and integrated disc and outer diameter fluid bearing 728 to form disc drive 700. One or more manufacturing processes may be required between each step shown in FIGS. 6A-D.

FIG. 6A shows cover 708 created on a first wafer substrate 702. For example, substrate 702 may comprise silicon. Cover 708 may be created using bulk micromachining processes. Cover 708 also includes patterned bonding material 704. Cover 708 may additionally include an integrated permanent magnet to interact with a voice coil of an actuator assembly and/or an environmental control component.

FIG. 6B shows MEMS process steps I and II performed on a second wafer substrate 710 to create integrated base and actuator electrodes 715. In step I, through-wafer electrical vias 712 are created through wafer substrate 710. For example, substrate 710 may comprise silicon. In step II, actuator electrodes 714 are deposited and patterned using actuator electrode patterns 712.

FIG. 6C shows MEMS process steps I-V performed on a third wafer substrate 716 to create integrated disc and outer diameter fluid bearing 728. In step I, sacrificial layer 718 is deposited on wafer substrate 716. For example, substrate 716 may comprise polished silicon. In step II, fluid bearing material 720 is deposited. For example, fluid bearing material 720 may be polysilicon. In step III, fluid bearing material 720 is patterned. For step IV, media layer 722 is deposited and patterned. For example, media layer 722 may be a thin film magnetic media. For step V, patterned bonding material 724 is added to the bottom of fluid bearing material 720.

FIG. 6D shows MEMS process steps I-III to combine cover 708, integrated base and actuator electrodes 715 and integrated disc and outer diameter fluid bearing 728 to form disc drive 700. In step I, integrated disc and outer diameter fluid bearing 728 is bonded to integrated base and actuator electrodes 715. In step II, sacrificial layer 718 is etched. For example, etching may be performed using anhydrous IF and alcohol vapor etch. Step II releases the disc from the fluid bearings. In step III, cover 708 is bonded integrated base and actuator electrodes 715 with bonding material 704. Bonding material 704 creates a hermetic seal to contain fluids within disc drive 700. For example fluids contained within disc drive 700 may be helium or liquid fluids.

Disc drive 700 may include additional features not shown in FIGS. 6A-D. For example, disc drive 700 also includes an actuator assembly and may also include actuator electrodes integrated within its base and permanent magnets integrate within its disc. Disc drive 700 may include an integrated sensor, an integrated environmental control component and/or integrated control circuitry. Each of these features may be manufactured using MEMS techniques as part of the first wafer, the second wafer or additional wafer(s).

A number of embodiments of the present invention have been described. Nevertheless, it will be understood that various modifications may be made without departing from the spirit and scope of the invention. For example, wafers used in the manufacture of MEMS disc drives may include components for more than one disc drive. Accordingly, these and other embodiments are within the scope of the following claims.

The invention claim is:

1. A first storage device comprising:
   a housing;
   an interface for connecting a second storage device on a first external side of the housing; and
   a set of vias integrated with the housing, wherein the vias extend through the housing to connect the interface to a component located on a second external side, opposite the first external side, of the housing.

2. The first storage device of claim 1, wherein the first side is substantially parallel to the second side.

3. The first storage device of claim 1, further composing a control circuitry integrated within the housing, wherein the control circuitry controls read and write operations in the first storage device.

4. The first storage device of claim 3, wherein the control circuitry further controls read and write operations in the second storage device.

5. The first storage device of claim 3, wherein the control circuitry is an integrated circuit.

6. The first storage device of claim 1, wherein the housing includes a base and a cover, wherein one or more vias of the set of vias extend though both the base and the cover.

7. The first storage device of claim 1, further comprising an environmental control module, wherein one or more via of the set of vias are electrically coupled to the environmental control module of the first storage device.

8. The first storage device of claim 1, wherein the component is a printed circuit board.

9. An assembly comprising:
   an electronic device including a first interface;
   a first storage device connected to the electronic device via the first interface, wherein the first storage device includes:
   a housing including a set of vias integrated within the housing, wherein the vias extend through the housing, and
   a second interface; and
   a second storage device connected to the second interface, wherein communication signals between the second storage device and the electronic device traverse one or more via of the set of vias.

10. The assembly of claim 9, further comprising a bonding pad, wherein the bonding pad secures the first storage device to the second storage device.

11. The assembly of claim 9, wherein the set of vias includes a subset of vias that couple a first environmental control module in the first storage device to a second environmental control module in the second storage device.

12. The assembly of claim 11, wherein the environmental control module includes a resistive heating element.

13. The assembly of claim 9, wherein the set of vias includes a subset of vias that couple a first set of disc actuation electrodes in the first storage device to a second set of disc actuation electrodes in the second storage device.

14. The assembly of claim 9, wherein electronic device includes a printed circuit board forming the first interface.

15. The assembly of claim 9, wherein the first storage device includes control circuitry that controls read and write operations of the second storage device.

16. The assembly of claim 15, wherein the first storage device includes a servo controller for the second storage device.

17. A storage device comprising:
   a housing fabricated using MEMS manufacturing processes;
   an interface for connecting an electronic device on a first external side of the housing; and
   a set of vias integrated with the housing, wherein the vias extend through the housing to connect the interface to a component located on a second external side, opposite the first external side, of the housing.

18. The storage device of claim 17, wherein the electronic device is a data storage device.

19. The storage device of claim 17, wherein the first external side is substantially parallel to the second external side.

20. The storage device of claim 1, wherein the interface for connecting the second storage device is configured to stack the second storage device on top of the first storage device.

21. The storage device of claim 17, wherein the storage device is a rotating magnetic disc drive.

* * * * *